(12) United States Patent
Shibue et al.

(10) Patent No.: US 8,094,138 B2
(45) Date of Patent: Jan. 10, 2012

(54) POSITION DETECTING DEVICE (75) Inventors: Shigenori Shibue, Tokyo (JP);
Yoshinori Asamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 827 days.

(21) Appl. No.: 11/889,041

(22) Filed: Aug. 8, 2007

(65) Prior Publication Data
US 2008/0150915 A1    Jun. 26, 2008

(30) Foreign Application Priority Data

Dec. 21, 2006  (JP) .................... 2006-344026

(51) Int. Cl.
G06F 3/042  (2006.01)
(52) U.S. Cl. ........................................ 345/176
(58) Field of Classification Search .......... 345/76, 345/102, 173, 179, 174–176; 178/18.01, 178/18.09, 19.01, 19.05
See application file for complete search history.

(56) References Cited

U.S. PATENT DOCUMENTS

| | | | | |
|---|---|---|---|---|
| 6,369,805 B1 * | 4/2002 | Kuzunuki et al. | ............. | 345/173 |
| 6,559,827 B1 * | 5/2003 | Mangerson | ................... | 345/102 |
| 6,597,348 B1 * | 7/2003 | Yamazaki et al. | ............ | 345/175 |
| 7,289,088 B2 * | 10/2007 | Matsumoto | ..................... | 345/76 |
| 2002/0101399 A1 * | 8/2002 | Kubo et al. | .................... | 345/104 |
| 2004/0080496 A1 * | 4/2004 | Cheon et al. | ................... | 345/166 |
| 2005/0110781 A1 * | 5/2005 | Geaghan et al. | ............. | 345/180 |
| 2006/0001654 A1 * | 1/2006 | Smits | ............................ | 345/176 |
| 2006/0066537 A1 | 3/2006 | Kimura et al. | | |
| 2006/0114244 A1 * | 6/2006 | Saxena et al. | ................. | 345/175 |

FOREIGN PATENT DOCUMENTS
JP    2000-172444 A    6/2000
* cited by examiner

*Primary Examiner* — Chanh Nguyen
*Assistant Examiner* — Pegeman Karimi
(74) *Attorney, Agent, or Firm* — Birch, Stewart, Kolasch & Birch, LLP (57) ABSTRACT

A position detecting device and method implemented therein that is able to accurately detect an indicated position even when a water droplet or the like is formed upon the position-detecting-device's surface. The device includes: a light-guide plate placed upon a displaying surface of a displaying device; an emitting unit for emitting light beams that are totally reflected thickness-wise within the light-guide plate, so as to scan along the sides of the light-guide plate in an X-axis and a Y-axis direction under the control of an emission-control unit; an indicating device; and a coordinate calculating unit. In the indicating device, a light-guiding part guides light traveling within the light-guide plate into a detection unit, which detects the guided light in order to output a detection signal. The coordinate calculating unit calculates a coordinate position by deriving a scanned position from the detection signal and the emission-control unit.

10 Claims, 5 Drawing Sheets

POSITION DETECTING DEVICE

BACKGROUND OF THE INVENTION

1. Field of the Invention

The present invention relates to position detecting devices that optically detect positions indicated by the indicating units upon an image display screen.

2. Description of the Related Art

As a device that optically detects a position indicated by an indicating unit upon an image display screen, a touch panel (touchscreen) is proposed in which, an illumination means is provided on one side of mutually opposing sides of a light-guide plate made of a translucent material and placed upon a displaying surface (screen) of a displaying device, and a light-sensor array is provided on the other side thereof; an indicating unit (input pen or stylus) that has a contacting part made of a translucent material at the unit's tip is contacted with the top surface of the light-guide plate; thereby, a position of the indicating unit is detected according to the change in the amount of light that reaches the light-sensor array (for example, refer to Japanese Patent Application Publication No. H12-172444 (2000), paragraphs 0017 through 0034, FIG. 1).

Problems to be Solved by the Invention

In the touch panel (touchscreen) described above, a position of the indicating unit is detected by adjusting the light emitted from the illumination means so as to be directed toward the opposing side of the light-guide plate, as being totally reflected thickness-wise, and by detecting a decrease of the amount of light that reaches the light-sensor array opposed to the illumination means, due to disturbance in conditions for the total reflection, caused by the indicating unit in contact with the plate. For this reason, when a water droplet is formed on the surface of the light-guide plate that is the topmost surface of the image display screen, the conditions for the total reflections are disturbed and part of the light escapes out of the light-guide plate, so that the amount of light reaching the light-sensor array decreases; thus, there exists a problem in that an indicated position is erroneously detected.

The present invention has been directed at solving these problems with the conventional technologies described above, and an object of the invention is to provide a position detecting device that is able to accurately detect an indicated position via an indicating unit or device even when a water droplet or the like is formed upon the position-detecting-device's surface.

SUMMARY OF THE INVENTION

Means for Solving the Problems

In one aspect of the present invention, a position detecting device comprises: a light-guide plate for placement upon a displaying surface of a displaying device, and made of a translucent material; an emitting unit for emitting, from the sides of the light-guide plate, arranged in line along the X-axis and the Y-axis, a plurality of light beams each of a predetermined width, so as to be totally reflected thickness-wise within the light-guide plate and to travel heading in predetermined directions parallel to the light-guide-plate plane; an emission-control unit for controlling the emitting unit so as to make the light beams each scan the light-guide plate in progression along the sides thereof, in an X-axis direction and in a Y-axis direction; at least one indicating device having a light-guiding part for guiding, by contacting the light-guide plate, thereinto light traveling within the light-guide plate, and a detection unit for outputting, by detecting the light guided via the light-guiding part, a detection signal; and a coordinate calculating unit for calculating, based on a scanned position derived from the detection signal and the emission-control unit, a coordinate position where the at least one indicating device contacts the light-guide plate.

EFFECTS OF THE INVENTION

According to the configuration described above, it is possible to provide a position detecting device that is capable of accurately detecting an indicated position via an indicating device even when a water droplet or the like is formed upon the position-detecting-device's surface.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereunder, preferred embodiments according to the present invention will be described in detail with reference to the accompanying drawings.

Embodiment 1

Figure 1:
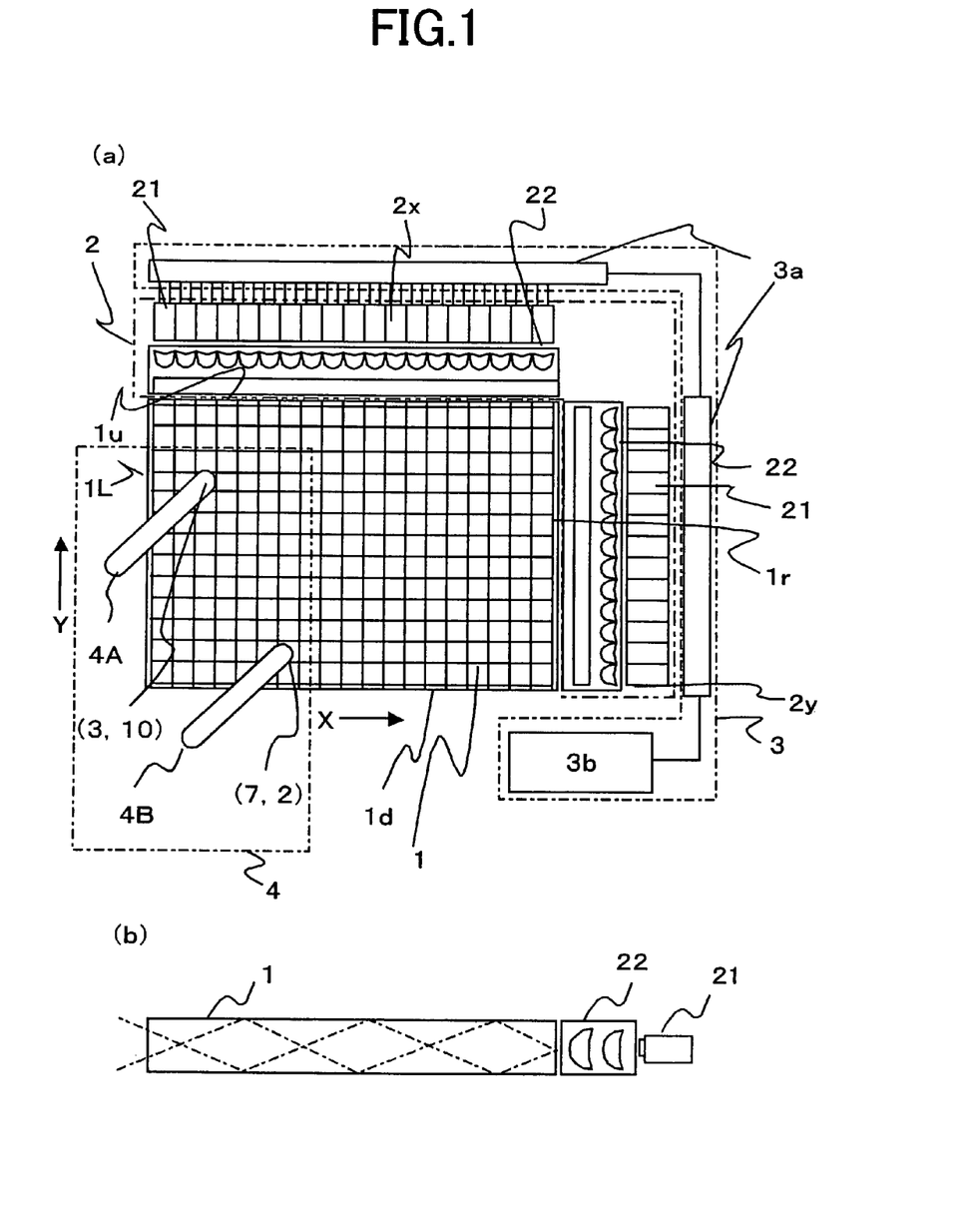
FIG. 1(a) and FIG. 1(b) are top plan and cross-sectional side views, respectively, each outlining a configuration of a position detecting device in Embodiment 1 of the present invention.
Figure 2:
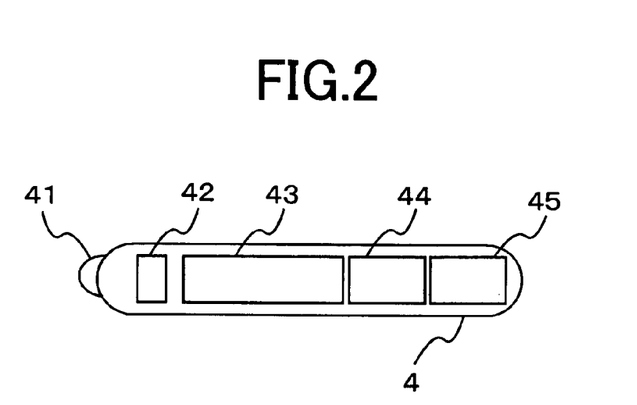
FIG. 2 is a diagram outlining a configuration of an indicating device (representative) in Embodiment 1 of the present invention.
Figure 3:
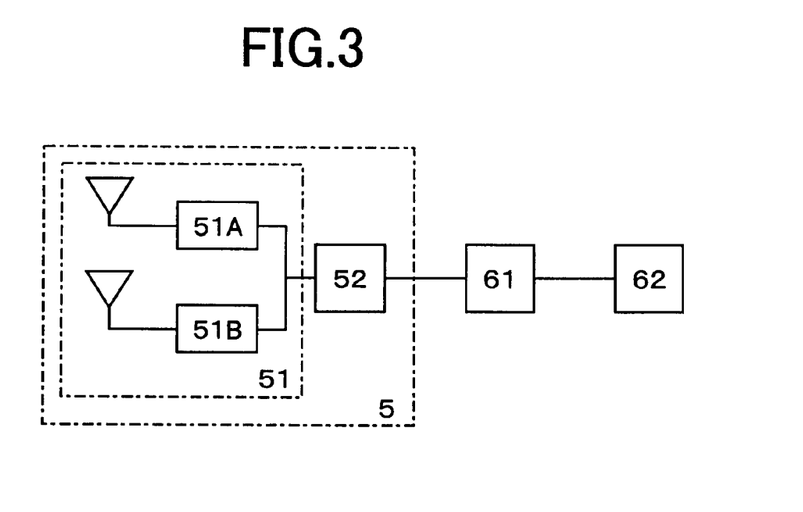
FIG. 3 is a block diagram outlining a coordinate outputting device in Embodiment 1 of the present invention.
Figure 4:
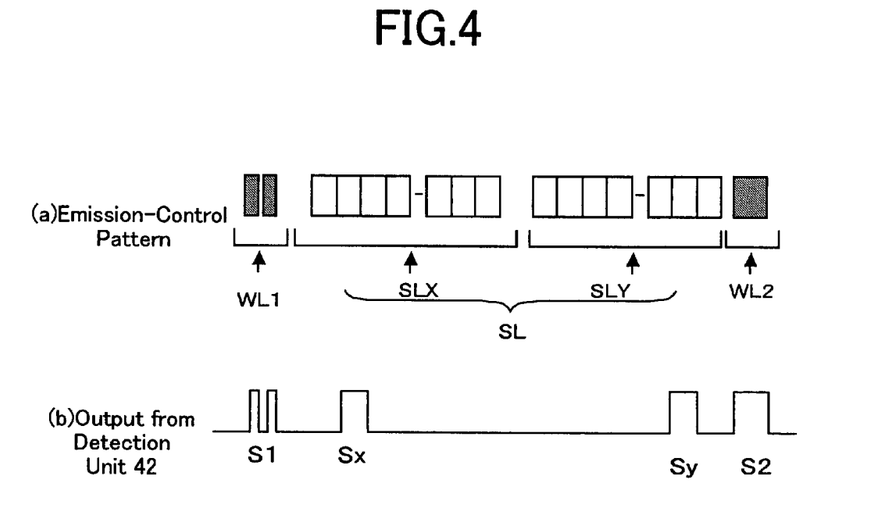
FIG. 4(a) and FIG. 4(b) are diagrams outlining an emission-control pattern and a detection signal in Embodiment 1 of the present invention, respectively.

FIG. 1(a) through FIG. 4(b) are diagrams showing a position detecting device in Embodiment 1 of the present invention, that is placed upon the image display screen of a displaying device. FIG. 1(a) is a top plan diagram outlining a configuration of the position detecting device, and FIG. 1(b) is a cross-sectional side diagram thereof (viewed from the bottom); FIG. 2 is a diagram outlining a configuration of an indicating device of the position detecting device; FIG. 3 is a block diagram outlining part of a circuit of the position detecting device; FIG. 4(a) is a diagram outlining an emission-control pattern, and FIG. 4(b) is a diagram outlining an output from a detection unit of the indicating device. In FIG. 1(a) and FIG. 1(b), the position detecting device has a light-guide plate 1 that is a square-shaped flat plate made of a transparent or translucent material; an emitting unit 2 that emits, from sides of the light-guide plate 1, arranged in line, a plurality of light beams each of a predetermined width, so as to be totally reflected thickness-wise within the light-guide plate 1 and to travel heading in predetermined directions parallel to the plane of the light-guide plate 1; an emission-control unit 3 that controls an emission pattern for the emitting unit 2 so that the light beams emitted from the emitting unit 2 scan the light-guide plate 1 in progression along the sides thereof; and at least one indicating device 4.

The light-guide plate 1 is a square-shaped glass plate having a refractive index of some 1.5 and a the thickness of some 5 mm, and is placed with a gap upon the displaying surface (screen) of the displaying device not shown in the figures; it is possible to watch the screen of the displaying device through the light-guide plate 1.

The emitting unit 2 has a plurality of light sources 21 (19 light sources along the X-axis, and 13 light sources along the Y-axis), and optical processing units 22 that, corresponding to the light sources 21 each, form light outputted from the light sources 21 into light beams, and emit the light beams each, arranged in line, from the sides of the light-guide plate 1. For the light sources 21 used are infrared semiconductor lasers that have two-dimensionally-spreading characteristics in their output distribution. Infrared semiconductor lasers are characterized in that the output distribution of the light outputted from the light sources 21 each two-dimensionally spreads; however, the outputted light is shaped by collimating lenses and cylindrical lenses that constitute the optical processing units 22, is diffused thickness-wise in the light-guide plate 1 within a predetermined angle, and in the light-guide-plate plane, is formed into light beams, each of which is parallel to the sides adjoining to each opposing (other) side, and is several millimeters (mm) in width. The shaped light (light beams each) is thus emitted toward the opposing sides of the light-guide plate 1 for the light sources 21 each, and, as shown in FIG. 1(b), is totally reflected thickness-wise within the light-guide plate 1 held in the air of a refractive index 1, so as to, without escaping from both surfaces of the light-guide plate 1, straightly travel toward the opposing (other) side thereof. In this embodiment, as shown in FIG. 1(a), the emitting unit 2 is constructed of an emitting unit 2x that is placed on the top side 1u of the light-guide plate 1, so as to allow laterally (along the X-axis) 19 light beams to be arranged in line, and of an emitting unit 2y that is placed on the right side 1r of the light-guide plate 1, so as to allow vertically (along the Y-axis) 13 light beams to be arranged in line. And then, the light beams emitted from the emitting unit 2x travel inside the light-guide plate 1 keeping parallelism to the right side 1r that perpendicularly adjoins to the emitted top side 1u, so as to reach the bottom side 1d; the light beams emitted from the emitting unit 2y travel inside the light-guide plate 1 keeping parallelism to the top side 1u that perpendicularly adjoins to the emitted right side 1r, so as to reach the left side 1L. In this case, by controlling adjoining optical paths of the light beams so as to mutually overlap inside the light-guide plate 1, it is possible to eliminate areas where the light beams do not travel.

The emission-control unit 3 is constructed of laser drivers 3a that drive the light sources 21 each, and a control unit 3b that controls the laser drivers 3a each; the emission-control unit 3 is dedicated to control the light sources 21 each to be powered on/off so that the light beams each emitted from the emitting unit 2 scan the light-guide plate 1 progressively along the sides (1u and 1r) thereof at some 10 ms intervals.

The indicating device 4 has a light-guiding part 41 that guides, by contacting the light-guide plate 1, thereinto light traveling within the light-guide plate 1; a detection unit 42 that outputs, by detecting the light guided via the light-guiding part 41, a detection signal; and further, a coordinate calculating unit 43 that calculates, based on a scanned position derived from the detection signal and the emission-control unit 3, a coordinate position where the indicating device 4 contacts the light-guide plate 1.

Hereinafter, the structure of the indicating device 4 will be explained based on FIG. 2. Note that, in this embodiment, two of such indicating devices 4 are used; in order to designate individually each of them, "A" or "B" is affixed to the numeral "4" such as an "indicating device 4A" or an "indicating device 4B," and when referred to as a whole, they are designated the "indicating device 4." At the tip of the indicating device 4, the light-guiding part 41 made of a transparent resin of high flexibility is provided. The light-guiding part 41 has a refractive index that is approximately the same as that of the light-guide plate 1; when the light-guiding part 41 is pressed upon the light-guide plate 1 with a predetermined pressure, it is closely contacted with the light-guide plate 1 to become optically joined with the light-guide plate 1 as if one part, so that, while disturbing conditions for the total reflection within the light-guide plate 1, the light-guiding part 41 guides light traveling in the light-guide plate 1 into the inside thereof. The guided light is detected by the detection unit 42 inside the indicating device 4, and is converted into an electric signal so as to be outputted as a detection signal. Moreover, the indicating device 4 has the coordinate calculating unit 43 that, based on the detection signal outputted from the detection unit 42 and a timing of scanning by the emission-control unit 3, determines that which light beam from the light sources the light detected by the light-guiding part 41 stems from, and outputs a coordinate signal SC after having calculated the coordinate position where the indicating device 4 contacts the light-guide plate 1. In addition, different identification information is assigned to the indicating device 4A and the indicating device 4B, and each of them has an identification-signal outputting unit 44 that outputs after having generated an identification signal SI based on the different identification information. And then, the coordinate signal SC and the identification signal SI are outputted into a transmitting unit 45 whose transmitting frequency is in a band of 2.4 GHz, and together with the identification signal SI, the coordinate signal SC is externally transmitted from the transmitting unit 45 as a transmitting signal ST.

The transmitting signal ST transmitted from the transmitting unit 45 of the indicating device 4 is received by a coordinate outputting device 5. The coordinate outputting device 5 has, as shown in FIG. 3, a receiving unit 51 that receives the transmitting signal ST from the indicating device 4, and a central processing unit (CPU) 52 that separates the transmitting signal ST received by the receiving unit 51 into the coordinate signal SC and the identification signal SI, and outputs the coordinate position of the indicating device 4. And then, an output from the CPU 52 of the coordinate outputting device 5 is outputted into a computer 62 via an external interface 61 such as a local-area network (LAN) and a universal serial bus (USB). In the computer 62, application software has been installed thereinside; thereby, based on the coordinate positions outputted for each of the indicating devices 4A and 4B, images to be displayed onto a displaying surface (screen), not shown in the figures, are controlled so that the images controlled based on the position information of the indicating device 4A and the indicating device 4B are outputted on the displaying surface (screen); thus, it is possible to watch the images through the light-guide plate 1. Note that, in this embodiment, because two indicating devices 4A and 4B are simultaneously used, the receiving unit 51 has two of such receiving units 51A and 51B corresponding to the indicating devices 4A and 4B, respectively.

Next, the operations of the position detecting device in this embodiment will be explained.

The emission-control unit 3 repeatedly performs an emission control in some 10 ms per one cycle that includes, as shown in FIG. 4(a), after a first simultaneous control WL1 that totally powers on and off the light sources 21 twice in predetermined time-intervals, scanning-type controls SL that perform to power on nineteen light sources in the emitting unit 2x of the light sources 21 so as to make the light beams each scan in progression from left to right along the sides of the light-guide plate 1 (progressive scanning SLX) and, next, to power on thirteen light sources in the emitting unit 2y of the light sources 21 so as to make the light beams each scan in progression from bottom to top along the sides of the light-guide plate 1 (progressive scanning SLY), and a second simultaneous control WL2 that totally powers on the light sources 21 once again for a predetermined time. Light outputted from the light sources 21 each is shaped in the optical processing units 22, and is emitted as light beams each of a predetermined width; the emitted light beams travel, as described above, so as to be totally reflected thickness-wise within the light-guide plate 1, in a state parallel to the sides adjoining to each emitted side thereof, heading toward the opposing (other) sides thereof.

At this time, when a light-guiding part 41A provided at the tip of the indicating device 4A is pressed upon the light-guide plate 1, the light-guiding part 41A is closely contacted with the light-guide plate 1, so that the air interface between the light-guide plate 1 and the light-guiding part 41A disappears; thereby, the light-guiding part 41A becomes optically joined with the light-guide plate 1 as if one part, so that, while disturbing conditions for the total reflection within the light-guide plate 1, the light-guiding part 41A guides light having been totally reflected on the inside surfaces of the light-guide plate 1 into the inside thereof. Light entered from a closely contacting part and guided into the light-guiding part 41A is detected by a detection unit 42A, and a detection signal is outputted therefrom. Here, when the indicating device 4A is placed at a position (3, 10) in FIG. 1(a), a signal the detection unit 42A outputs becomes as shown in FIG. 4(b). In whichever areas the indicating device 4A is placed upon the light-guide plate 1, the detection unit 42A detects part of light beams when the light sources 21 are totally powered on by the first simultaneous control WL1, and outputs a first signal S1. Next, according to the scanning-type controls SL and corresponding to the position (3, 10) the indicating device 4A is contacting the light-guide plate 1, a third light beam from the left in the emitting unit 2x of the light sources 21 is detected, and an X-scanned signal Sx is outputted; in addition, a tenth light beam from the bottom in the emitting unit 2y of the light sources 21 is detected, and a Y-scanned signal Sy is outputted; and finally, part of light beams are detected when the light sources 21 are totally powered on for a predetermined time by the second simultaneous control WL2, and a second signal S2 is outputted.

According to this embodiment, the amount of light that is guided into the light-guiding part 41 is small in comparison to that of the light beams; thereby, even when a plurality of such indicating devices 4 is used, other such indicating devices 4 do not exert an effect on a position detecting accuracy thereof.

In addition, when a water droplet is formed on the surface of the light-guide plate 1 that is the topmost surface of the image display screen, and hence, part of the light escapes out of the light-guide plate 1, the amount of light reaching the opposing sides decreases to a small extent; thus, there does not exist a problem in that a position of the water droplet is erroneously recognized as the position of the indicating device 4.

The first signal S1 can be distinguished from other signals by powering on and off twice in predetermined time-intervals in the first simultaneous control WL1 as described above; similarly, the second signal S2 can also be distinguished from other signals by powering on for a predetermined time in the second simultaneous control WL2. In addition, because a time the light beams each are emitted according to the scanning that is controlled by the emission-control unit 3 can be easily calculate based on the time from the first simultaneous control WL1 to the second simultaneous control WL2, by distinguishing the first signal S1 and the second signal S2 from the X-scanned signal Sx and the Y-scanned signal Sy, it is possible to identify the light sources 21 of which the light beams are detected. In this embodiment, because powering-on methods are changed in the scanning-type controls SL with respect to the first simultaneous control WL1 and the second simultaneous control WL2, by defining the first signal S1 as "start bits" and the second signal S2 as "stop bits," and by calculating in what timing the X-scanned signal Sx and the Y-scanned signal Sy having been detected by the scanning-type controls SL are detected in the time-interval from the first signal S1 to the second signal S2, it is possible to identify a scanned position performed by the emission-control unit 3, namely, the light sources 21 from which the detected light beams are emitted. In addition, because the light beams each emitted from the emitting unit 2x travel parallel to the Y-axis while keeping a predetermined width, and the light beams each emitted from the emitting unit 2y also travel parallel to the X-axis while keeping a predetermined width, it is possible to calculate, by identifying each of the light sources 21, a position of the indicating device 4A as the X and Y coordinates of the position (3, 10). As a result, a coordinate calculating unit 43A of the indicating device 4A identifies, based on the detection signal outputted from the detection unit 42A, the detected light beams whether the light beams are from which of the light sources 21 stemmed; in addition, based on the light sources 21 having been identified, it is possible to calculate a two-dimensional coordinate position of the indicating device 4A upon the light-guide plate 1. What is more, because the emission control constitutes a short time of some 10 ms per one cycle to some extent, it is possible to smoothly detect in real time a position of the indicating device 4A in motion. At this time, in an overlapping area where optical paths of adjoining light beams overlap each other, two detection signals are continuously outputted as the X-scanned signal Sx or as the Y-scanned signal Sy, under the scanning-type controls SL; however, also in this case, it is possible to identify an intermediate position between two of the light sources 21, so that a position of the indicating device 4A can be accurately detected.

Moreover, even when there is a gap or space interval between optical paths of adjoining light beams, and in a case in which the light-guiding part 41 of the indicating device 4 contacts closely with the light-guide plate 1 in a wider area covering the space interval between the optical paths so as to guide into the light beams, it becomes possible to detect a coordinate position without forming a non-detectable area in which the light beams can not be detected within the surface of the light-guide plate 1.

And then, the coordinate calculating unit 43A of the indicating device 4A outputs the calculated coordinate position (3, 10) as a coordinate signal SCA. On the other hand, an identification-signal outputting unit 44A generates an identification signal SIA assigned for the indicating device 4A, and output it; thus, a transmitting unit 45A receives the coordinate signal SCA from the coordinate calculating unit 43A and the identification signal SIA from the identification-signal outputting unit 44A, and externally transmits the coordinate signal SCA together with the identification signal SIA, as a transmitting signal STA.

The transmitting signal STA sent from the transmitting unit 45A is received by the receiving unit 51A in the coordinate outputting device 5, that corresponds to a transmitting frequency of the indicating device 4A; then, the transmitting signal STA that is received is separated by the CPU 52 into the coordinate signal SCA and the identification signal SIA, and are outputted from the coordinate outputting device 5 as the coordinate position (3, 10) of the indicating device 4A.

Similarly, in a case of the indicating device 4B placed at the coordinate position (7, 2) upon the light-guide plate 1, the coordinate position (7, 2) can be calculated based on a detection signal as described above; a transmitting unit 45B of the indicating device 4B transmits an identification signal SIB of the indicating device 4B together with a coordinate signal SCB as a transmitting signal STB; and the transmitting signal STB that is transmitted is received by the receiving unit 51B that corresponds to a transmitting frequency of the indicating device 4B; then, the transmitting signal STB that is received is separated by the CPU 52 into the coordinate signal SCB and the identification signal SIB, and are outputted from the coordinate outputting device 5 as the coordinate position (7, 2) of the indicating device 4B.

The output from the coordinate outputting device 5 described above is outputted as the two-dimensional coordinates of each of such indicating devices 4, having been distinguished for the indicating devices 4 each upon an image display screen, and are inputted into the computer 62 via the external interface 61 such as a local-area network (LAN) and a universal serial bus (USB). The computer 62 holds image information inside, and outputs the image information that is held, as an imaging signal, into a displaying device not shown in the figures. At this time, when the coordinate signals SCA and SCB, and the identification signals SIA and SIB are inputted into the computer 62 from the external interface 61, by using application software having been installed thereinside, image information is controlled based on the inputted position information, and the controlled image information is outputted as an imaging signal into the displaying device; thus, it is possible to watch the images displayed onto a displaying surface (screen) of the displaying device through the light-guide plate 1.

Namely, the indicating device 4 comprises the light-guiding part 41 and the detection units 42; and, because, in a state in which light is emitted so as to make light beams each of a predetermined width scan in progression heading toward the sides of the light-guide plate 1 that is placed upon the displaying surface (screen) of the displaying device, by contacting the light-guiding part 41 of the indicating device 4 with the light-guide plate 1, the indicating device 4 detects light within the light-guide plate 1, so that the coordinate position is detected based on the detection signal and a scanned position; thus, even when a water droplet or the like is formed upon the light-guide plate 1 that is the surface of a display screen, it is possible to detect a position of the indicating device 4 accurately and, what is more, in real time. In addition, an obstacle such as paper upon the light-guide plate 1, has no influencing the condition for the total reflection within the light-guide plate 1. It is possible to accurately detect the coordinates, even when there is the obstacle upon the light-guide plate 1, as far as the obstacle does not become caught between the indicating device 4 and the light-guide plate 1. Moreover, because light emitted toward the light-guide plate 1 is selected from the light in invisible region (light bands), quality of the images on an image display screen is not influenced.

Furthermore, by assigning identification information to each of such indicating devices 4, even when a plurality of indicating devices is used at the same time, it is possible to accurately detect a position for each of the plurality of indicating devices by distinguishing the indicating devices each. Note that, in this embodiment, in order to avoid the interference between the transmitting signals STA and STB transmitted from the indicating devices 4A and 4B respectively having different transmitting frequencies, the receiving unit 51 is provided with two of such receiving units 51A and 51B that correspond to the number of indicating devices; however, the number of usable indicating devices is not limited in this embodiment. It is possible to further increase the number of them. In addition, as shown in the IEEE Std 802.15.1 standard, by using a receiving unit in which one receiving unit is capable of connecting a plurality of units or devices transmitting, it is possible to arrange so that signals transmitted from a plurality of indicating devices can be received.

Embodiment 2

Figure 5:
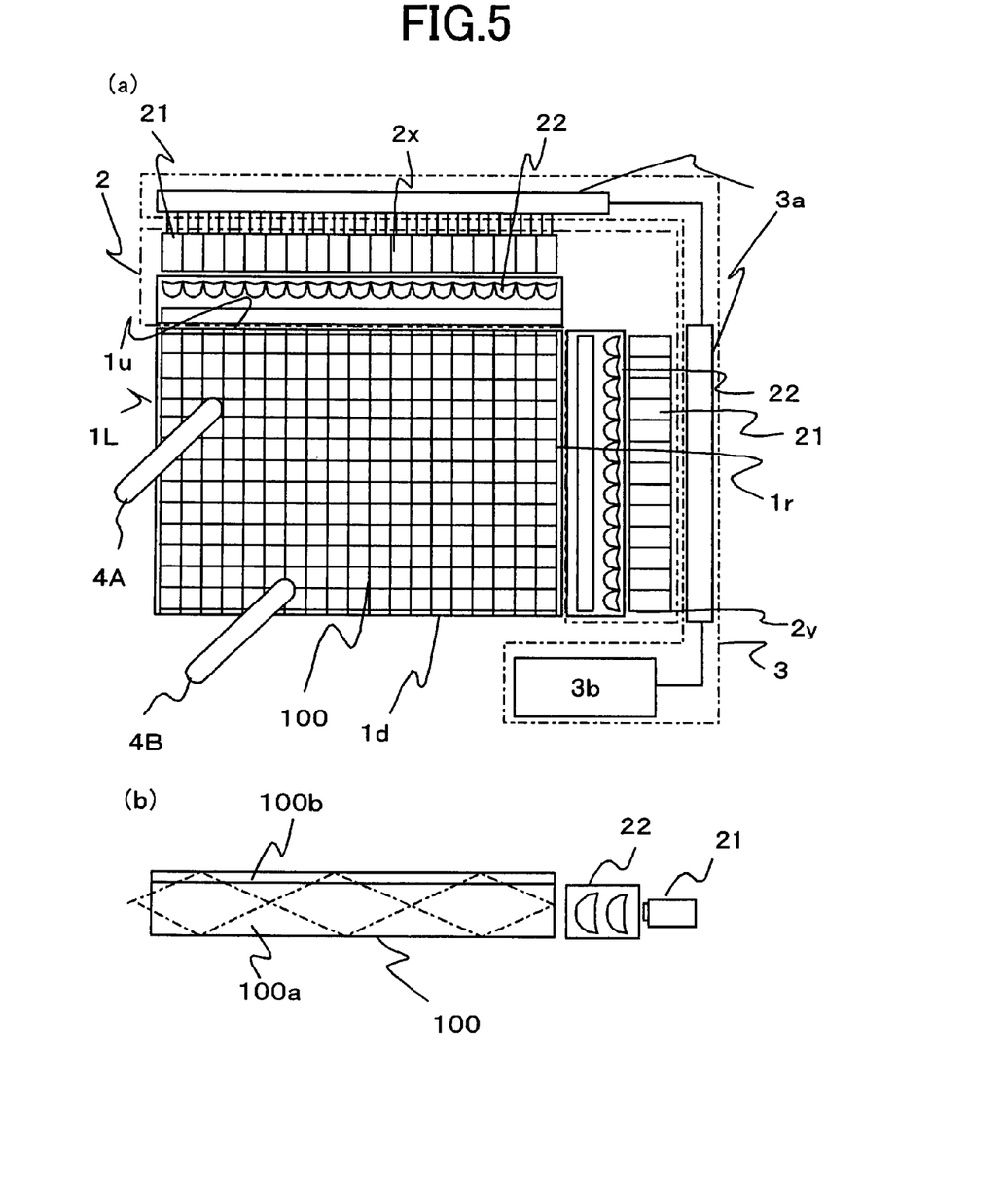
FIG. 5(a) and FIG. 5(b) are top plan and cross-sectional side views, respectively, each outlining a configuration of a position detecting device in Embodiment 2 of the present invention.

FIG. 5(*a*) and FIG. 5(*b*) show a position detecting device in Embodiment 2 of the present invention; FIG. 5(*a*) is a top plan diagram outlining a configuration of the position detecting device, and FIG. 5(*b*) is a cross-sectional side diagram thereof (viewed from the bottom). In this embodiment, a light-guide plate 100 is constructed of a first light-guide plate 100*a* made of a glass plate, and a second light-guide plate 100*b* that is softer and easier to be transformed than the first light-guide plate 100*a* and overlaid thereupon. Other constituent items are equivalent or similar to those in Embodiment 1. The same reference numerals and symbols designate the same items as or items corresponding to those described in Embodiment 1; thus their explanation is omitted.

The first light-guide plate 100*a* is a square-shaped glass plate having a refractive index of some 1.5 and a thickness of some 5 mm; the second light-guide plate 100*b* is made of a soft resin having a refractive index of some 1.3. As shown in FIG. 5(*b*), the light-guide plate 100 is constructed of the first light-guide plate 100*a* and the second light-guide plate 100*b* that is overlaid thereupon. The emitting unit 2 performs, via the optical processing units 22, adjustment of thickness-wise angles of the outputted light from the light sources 21 each into the light-guide plate, similarly to the manner as set forth in Embodiment 1, so that the emitted light (light beams each) is totally reflected at both inner surfaces of the light-guide plate 100. In this case, emitted light is totally reflected thickness-wise inside surfaces of the light-guide plate 100 by the part where the second light-guide plate 100*b* is closely contacted with the first light-guide plate 100*a*; by the part where the second light-guide plate 100*b* is not closely contacted with the first light-guide plate 100*a*, emitted light is totally reflected thickness-wise within the second light-guide plate 100*b* and also within the first light-guide plate 100*a*; thereby, without the light escaping at any parts of both surfaces of the light-guide plate 100, the emitted light (light beams each) is able to travel toward the opposing (other) side.

Next, the operations of the position detecting device in this embodiment will be explained.

Figure 6:
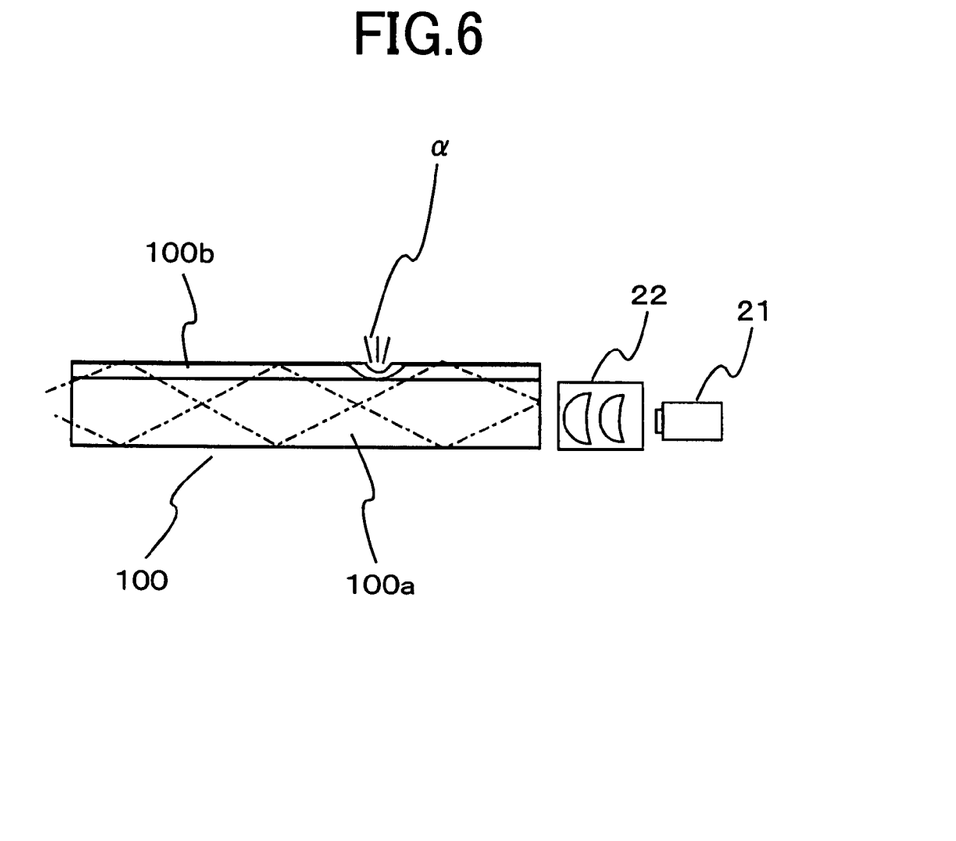
FIG. 6 is a diagram showing the operations of the position detecting device in Embodiment 2 of the present invention.

Similarly to the manner as set forth in Embodiment 1, in a state in which light is emitted into the light-guide plate 100 via the emitting unit 2, when the light-guiding part 41 provided at the tip of the indicating device 4 is pressed upon the light-guide plate 100, part of the second light-guide plate 100b that is indicated by "α (alpha)" is transformed or distorted as shown in FIG. 6 (cross-sectional side view), so that angularities of the top side of the light-guide plate 100 change. Moreover, an area of the light-guiding part 41 closely contacting the second light-guide plate 100b is increased; thus, it is possible to efficiently guide part of light traveling in the light-guide plate 100 into the light-guiding part 41. For this reason, it becomes easy to accurately detect a position of the indicating device 4.

Namely, according to Embodiment 2, because the light-guide plate 100 is constructed of the first light-guide plate 100a and the second light-guide plate 100b that is softer than the first light-guide plate 100a and overlaid thereupon, by easily detecting light traveling in the light-guide plate 100 without depending on the hardness and shape of the light-guiding part 41 of the indicating device 4, it becomes possible to detect a position of the indicating device 4 based on a detection signal and a scanned position of the emission-control unit 3.

Embodiment 3

Figure 7:
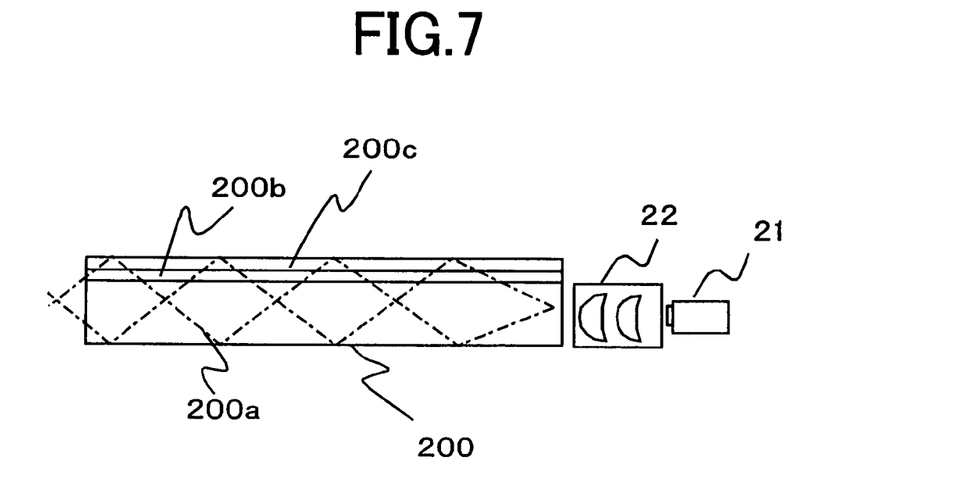
FIG. 7 is a cross-sectional side view outlining a configuration of a position detecting device in Embodiment 3 of the present invention.

FIG. 7 is a cross-sectional side view outlining a light-guide plate 200 of a position detecting device in Embodiment 3 of the present invention. In this embodiment, the light-guide plate 200 is constructed of three layers of light-guide plates. Other constituent items are equivalent or similar to those in Embodiment 2. The same reference numerals and symbols designate the same items as or items corresponding to those described in Embodiment 2; thus their explanation is omitted.

A first light-guide plate 200a is a square-shaped glass plate having the same refractive index of some 1.5 and thickness of some 5 mm as those in Embodiment 2. Upon the top surface of the first light-guide plate 200a, a third light-guide plate 200b is formed; what is more, upon the top surface of the third light-guide plate 200b, a fourth light-guide plate 200c is formed. Although a transparent material of high flexibility is used for the third light-guide plate 200b, it is possible to use, instead of solid material, a material of fluidity such as pure water and alcohol by tightly sealing it between the first light-guide plate 200a and the fourth light-guide plate 200c. For the fourth light-guide plate 200c, a resin such as a thin acrylic film can be used. In the emitting unit 2, the optical processing units 22 each are adjusted so that angles of the light beams each reflecting thickness-wise within the light-guide plate 200 are set in such a manner that emitted light passes through boundaries between neighboring two of the light-guide plates 200a, 200b, and 200c, meanwhile, it is totally reflected by that between the light-guide plate 200 and the air.

Next, the operations of the position detecting device in this embodiment will be explained.

Similarly to the manner as set forth in Embodiment 2, in a state in which light is emitted into the light-guide plate 200 via the emitting unit 2, when the light-guiding part 41 provided at the tip of indicating device 4 is pressed upon the light-guide plate 200, part of the third light-guide plate 200b that is flexible or pliable is transformed, so that part of the fourth light-guide plate 200c that is thin and overlaid upon the third light-guide plate 200b is also transformed. Because of this, part of the top side of the light-guide plate 200 (i.e., the fourth light-guide plate 200c) is pressed by the light-guiding part 41 and is transformed or distorted similarly to the manner as set forth in Embodiment 2, so that angularities of the top side of the light-guide plate 200 change. Moreover, an area of the light-guiding part 41 closely contacting the fourth light-guide plate 200c is increased; thus, it is possible to efficiently guide part of light traveling in the light-guide plate 200 into the light-guiding part 41. At this time, because the light-guiding part 41 closely contacting the fourth light-guide plate 200c is overlaid upon the third light-guide plate 200b that is flexible or pliable, even when material of high strength is used for the fourth light-guide plate 200c, it can be transformed by reducing its thickness; therefore, it becomes possible to reduce friction between the light-guide plate 200 and the light-guiding part 41, and to reinforce the durability therewith against wear.

Namely, according to Embodiment 3, because the light-guide plate 200 is constructed of three layers of light-guide plates in which the third light-guide plate 200b of soft material is provided between the first light-guide plate 200a and the fourth light-guide plate 200c, it becomes possible to easily detect light traveling in the light-guide plate 200 without depending on the hardness and shape of the light-guiding part 41 of the indicating device 4; in addition, it becomes easy to reinforce the strength and durability of the top surface of the light-guide plate 200.

Moreover, in each of the embodiments described above, although the coordinate calculating unit 43 is provided in the indicating device 4, it may be possible to arrange that the indicating device 4 includes only those functions to detect light and to transmit a detection signal alone or together with an identification signal, and then, the coordinate outputting device 5 has the function to calculate a position of the indicating device 4.

In addition, in each of the embodiments described above, although the light sources 21 each are provided according to the light beams each, and emission of the light beams is controlled by controlling powering on/off each of the light sources 21, it is possible to control the emission of the light beams each, while keeping the light sources 21 powered on, using shutters such as a liquid crystal display (LCD) provided at the outlets of the optical processing units 22, and the shutters are controlled open/close corresponding to the light beams each. In this case, after laterally spreading an output of a laser, and by collimating it as collimated light using a lens, one laser can be used as light sources for a plurality of light beams; therefore, the number of lasers can be reduced.

In addition, it is possible to change the number of light beams as appropriate according to the positional degree of accuracy and a screen size. Moreover, other than the laser, a light-emitting diode may be used for the light sources 21. However, because the light-emitting diode is inferior to the laser in a light-condensing characteristic, in order to maintain a position detecting accuracy, adjustment of the optical processing units 22 and the like is necessary according to the light sources 21 used.

In addition, it is possible to change as appropriate a power-on control that is used to recognize the start bits and the stop bits in each of the embodiments described above. In addition, other than an asynchronous method using the start bits and the stop bits, it is possible to identify a scanned position by using other synchronous method such as a clock embedded method.

Furthermore, in place of those light-guide plates using glass, a resin such as acryl may be used. In that case, in order to totally reflect the emitted light thickness-wise, it is necessary to adjust its diffusion angles formed thickness-wise by the emitting unit 2. Although not having referred so much to the sides (1d and 1L) opposing the sides (1u and 1r) from which the light beams are emitted, in order to efficiently use the emitted light, it may be possible to reflect the light by providing a mirror coating on the opposing (other) sides each, so that part of the emitted light can be reflected back to the light sources 21 where the light has been emitted.

While the present invention has been shown and described in detail, the foregoing description is in all aspects illustrative and not restrictive. It is therefore understood that numerous modifications and variations can be realized without departing from the scope of the invention.

What is claimed is:

1. A position detecting device, comprising:
a light-guide plate for placement upon a displaying surface of a displaying device, and made of a translucent material;
an emitting unit for emitting, from sides of said light-guide plate, arranged in line along an X-axis and a Y-axis, a plurality of light beams each of a predetermined width, so as to be totally reflected thickness-wise within said light-guide plate and to travel heading in predetermined directions parallel to the light-guide-plate plane;
an emission-control unit for controlling said emitting unit so as to perform a scanning by making the light beams each scan said light-guide plate in progression along the sides thereof, in an X-axis direction and in a Y-axis direction;
at least one indicating device having
a light-guiding part for guiding, by contacting said light-guide plate, thereinto light traveling within said light-guide plate, and
a detection unit for outputting, by detecting the light guided via the light-guiding part, a detection signal; and
a coordinate calculating unit for calculating, based on a scanned position derived from the detection signal and said emission-control unit, a coordinate position where said at least one indicating device contacts said light-guide plate,
wherein the emitting unit has a first plurality of light sources along one side arranged in line along the X-axis, and a second plurality of light sources along another side arranged in line along the Y-axis,
wherein the emission-control unit performs
a first control causing the first and second pluralities of light sources to simultaneously emit according to a first pattern a predetermined time before the initial light beam emission is performed in the scanning, thus notifying the coordinate calculating unit of a start time of the scanning;
a second control causing the first and second pluralities of light sources to simultaneously emit according to a second pattern a predetermined time after the final light beam emission is performed in the scanning, thus notifying the coordinate calculating unit of a stop time of the scanning; and
a scanning type control in between the first and second controls that causes each of the first and second pluralities of light sources to emit a light beam scanning in progression along the X-axis and the Y-axis, respectively, and
wherein the first pattern causes the first and second pluralities of light sources to simultaneously emit twice in predetermined time intervals, and the second pattern causes the first and second pluralities of light sources to simultaneously emit once for a predetermined time.

2. The position detecting device as set forth in claim 1, wherein
the emitting unit has a plurality of light sources that outputs the light beams along the sides of the light-guide plate.

3. The position detecting device as set forth in claim 1, wherein
the emitting unit has a plurality of shutters that controls emission of the light beams along the sides of the light-guide plate.

4. The position detecting device as set forth in any one of claims 1 through 3, wherein
said at least one indicating device has said coordinate calculating unit, and a transmitting unit for transmitting externally, as a coordinate signal, the coordinate position calculated by said coordinate calculating unit.

5. The position detecting device as set forth in claim 4, wherein
said at least one indicating device includes a plurality of indicating devices each having different identification information, and transmitting, together with the coordinate signal, an identification signal based on its identification information; the position detecting device further comprising
a coordinate outputting device for receiving the identification signal and the coordinate signal transmitted from said at least one indicating device, and for outputting, based on the received identification and coordinate signals, the coordinate position, so as to distinguish the plurality of indicating devices from each other.

6. The position detecting device as set forth in claim 1, wherein
the emitting unit takes, before and after the light beams scanning in progression, a first simultaneous control and a second simultaneous control whereby the light beams are emitted at the same time.

7. The position detecting device as set forth in claim 1, wherein
the light-guide plate is constructed of a first light-guide plate, and a second light-guide plate that is softer than the first light-guide plate and overlaid thereupon.

8. The position detecting device as set forth in claim 1, wherein
the coordinate calculating unit calculates the coordinate position based on a timing of the scanning controlled by the emission-control unit, and a timing of the detection of the light as indicated by the detection signal.

9. The position detecting device as set forth in claim 1, wherein the coordinate calculating unit calculates the coordinate position based on the time between the first and second controls when the detection of the light as indicated by the detection signal occurred.

10. A method implemented in a position detecting device which includes a light-guide plate disposed on a displaying surface of a displaying device and made of a translucent material, a first plurality of light sources arranged in line along one side of the light-guide plate arranged in an X-axis direction, and a second plurality of light sources arranged in line along another side arranged in a Y-axis direction, the method comprising:
controlling said first and second plurality of light sources to perform a scanning by emitting light beams, each of a predetermined width, which scan the light-guide plate in progression along the sides in the X-axis direction and Y-axis direction, respectively, so as to be totally reflected thickness-wise within said light-guide plate and to travel in predetermined directions parallel to the light-guide-plate plane;

utilizing an indicating device to contact the light-guide plate, the indicating device having:
- a light-guiding part which guides thereinto part of the light traveling within the light-guide plate when the indicating device contacts the light guiding plate, and
- a detection unit outputs a detection signal in response to detecting the light guided via the light-guiding part; and calculating, based on a scanned position derived from the detection signal and a timing of the controlled scanning of a light beam, a coordinate position where said at indicating device contacts said light-guide plate, wherein a first control of causing the first and second plurality of light sources to simultaneously emit according to a first pattern is performed a predetermined time before the initial light beam emission is performed in the scanning, thus providing a notification of a start time of scanning, wherein a second control of causing the first and second plurality of light sources to simultaneously emit according to a second pattern is performed a predetermined time after the final light beam emission is performed in the scanning, thus providing a notification of a stop time of scanning, wherein the first and second pluralities of light sources are controlled to cause the scanning of the light beams to occur between the first and second controls, wherein the coordinate position is calculated based on the time between the first and second controls when the detection of the light as indicated by the detection signal occurred, and wherein the first pattern causes the first and second pluralities of light sources to simultaneously emit twice in predetermined time intervals, and the second pattern causes the first and second pluralities of light sources to simultaneously emit once for a predetermined time.

* * * * *